(12) United States Patent
Okui et al.

(10) Patent No.: US 6,176,965 B1
(45) Date of Patent: Jan. 23, 2001

(54) METHOD FOR PRODUCING A BONDED STRUCTURE OF ALUMINUM ALLOY PRESSED PLATE

(75) Inventors: Kazuyuki Okui; Makoto Shiokawa, both of Saitama-ken (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 08/083,838

(22) Filed: Jun. 25, 1993

Related U.S. Application Data

(62) Division of application No. 07/698,510, filed on May 10, 1991, now Pat. No. 5,248,559.

(30) Foreign Application Priority Data

May 11, 1990 (JP) .................................................... 2-121999

(51) Int. Cl.$^7$ ...................................................... C09J 5/04
(52) U.S. Cl. .............................. 156/314; 72/42; 156/216; 428/420; 523/427; 523/428; 523/451

(58) Field of Search ................................. 156/216, 314; 523/427, 451, 428; 428/420; 72/42

(56) References Cited

U.S. PATENT DOCUMENTS

| 4,845,136 | * | 7/1989 | Saito et al. | 523/451 |
| 4,869,764 | * | 9/1989 | Marwick | 156/314 |

* cited by examiner

Primary Examiner—John J. Gallagher
(74) Attorney, Agent, or Firm—Lyon & Lyon LLP

(57) ABSTRACT

A bonded structure of an Al alloy pressed plate, in which another member is bonded onto the surface of the Al alloy pressed plate that has a lubricant layer by use of an epoxy resin based adhesive. The adhesive contains an epoxy resin, a dehydrated phosphate and a latent curing agent. The epoxy resin comprises a polyester type epoxy resin and at least one resin selected from the group consisting of a bisphenol epoxy resin, a rubber-modified bisphenol epoxy resin, and a urethane-modified epoxy resin.

16 Claims, 1 Drawing Sheet

METHOD FOR PRODUCING A BONDED STRUCTURE OF ALUMINUM ALLOY PRESSED PLATE

This is a Divisional application, of Ser. No. 07/698,510, filed May 10, 1991, now U.S. Pat. No. 5,248,559.

The present invention relates to a bonded structure of an Aluminum (Al) alloy pressed plate and more particularly, to a bonded structure in which a member is bonded onto a surface of an Al alloy pressed plate which has a lubricant layer by use of an epoxy resin based adhesive.

Currently, in the fabrication of an Al alloy pressed plate, an Al alloy sheet having a lubricant layer on the surface thereof is used as a starting material in order to increase the productivity. When another member is to be bonded onto such a pressed plate by use of an epoxy resin based adhesive, the pressed plate is subjected to a degreasing treatment prior to the bonding operation to remove the lubricant layer and then the plate is subjected to a chemical conversion treatment to form an oxidized film having good durability, because the naturally oxidized film on the surface of the pressed plate does not have a sufficient durability.

However, if the pressed plate must be subjected to the degreasing and chemical conversion treatments as described above, many steps are required, thereby resulting in a hindrance to productivity.

Accordingly, it is an object of the present invention to provide a bonded structure of the type described above, where the need for the degreasing and chemical conversion treatments can be eliminated by using a particular epoxy resin based adhesive.

According to the present invention, there is provided a bonded structure of an Al alloy pressed plate, in which a member is bonded onto a surface of an Al alloy pressed plate which has a lubricant layer by use of an epoxy resin based adhesive, wherein the adhesive contains an epoxy resin, a dehydrated phosphate and a latent curing agent, with the epoxy resin comprising at least one resin selected from the group consisting of a bisphenol epoxy resin (bisphenol resin), a rubber-modified bisphenol epoxy resin, a urethane-modified epoxy resin, a polyester type epoxy resin, and some combinations thereof.

With the above feature, the polyester type epoxy resin has a good compatibility with the lubricant layer, while the bisphenol epoxy resin and the like exhibit higher adhesive strength. Moreover, the dehydrated phosphate produces a chelate compound with Al ions of the pressed plate to suppress a reduction in strength due to water in the naturally oxidized film, which forms on the surface of the pressed plate. Therefore, if such an adhesive is used, and even if no degreasing and chemical conversion treatments are conducted, the pressed plate and the other member can be bonded firmly, and the durability of the bonded structure can be increased.

The invention will be described in connection with a preferred embodiment illustrated in the accompanying drawings, wherein.

The vehicle body panel 1 is comprised of an outer panel component 2 comprised of an Al alloy pressed plate and an Al alloy inner panel component 3 as another member, with the edges of the components 2 and 3 being bonded to each other.

Figure 1:
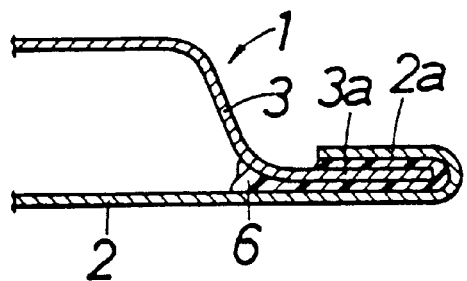
FIG. 1 is a sectional view of a bonded structure of this invention incorporated in a vehicle body panel.
Figure 2:
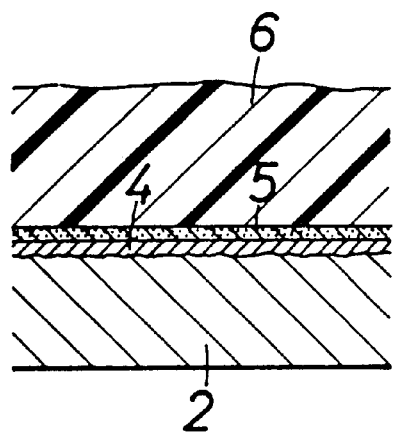
FIG. 2 is an enlarged sectional view illustrating an outer panel component for the vehicle body panel with an adhesive applied to the outer panel.
Figure 3:
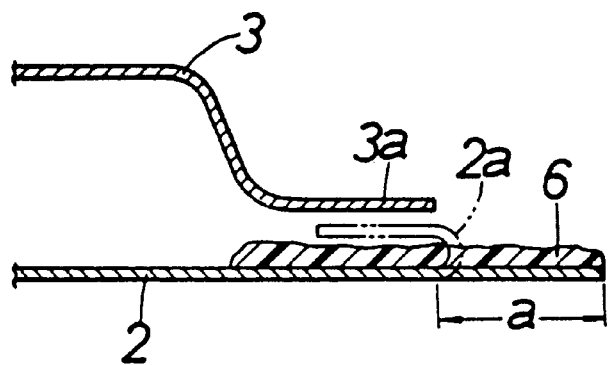
FIG. 3 is a sectional view illustrating the operation of bonding the outer and inner panel components for the vehicle body panel shown in FIG. 1.

As shown in FIG. 2, during the production process the outer panel component 2 is produced by pressing an Al alloy sheet having a naturally oxidized film 4 and a lubricant layer 5 on a surface thereof into the desired shape of the vehicle body panel. In bonding the outer panel component 2 with the inner panel component 3, an epoxy resin based adhesive 6 is applied to the surface of the outer panel component 2 having the lubricant layer 5. The epoxy resin based adhesive 6 is applied along the edge of the outer panel component 2, as shown in FIG. 3. An edge 3a of the inner panel component 3 overlaps onto the adhesive 6 such that a folding portion "a" of the outer panel component 2 is left exposed, i.e., is not overlapped by the inner panel component 3. Thereafter, the edge portion "a" of the outer panel component 2 is folded by hemming, and the edge 3a of the inner panel component 3 is enclosed and bonded through the adhesive 6 by the U-shaped folded portion 2a formed thereby. The adhesive is cured by heating in a subsequent step for baking a coating on the vehicle body panel 1.

The Al alloy sheets which may be used include materials defined as JIS specification Nos. 5,000's and 6,000's and containing Si, Fe, Cu, Mg, Mn and Zn.

The lubricant forming the lubricant layer 5 is a lubricant known under a trade name of X Coat made by Parker Corp. and has a composition which is as follows:

| | |
|---|---|
| Ester-based compound | 30% by weight |
| Kerosene-based solvent | 65% by weight |
| Corrosion preventing agent (carboxylic barium) | 5% by weight |

The ester compound used includes those represented by the general formula $C(CH_2OCOR)_4$, wherein R represents an alkyl group.

Such lubricant has a specific gravity of 0.803 (at 20° C.), a flash point of 73° C. and a viscosity of 2.77 cSt (at 100° C.). The amount of lubricant applied to the outer panel component is in a range of 0.5 to 2 $g/m^2$.

The adhesive contains an epoxy resin, a dehydrated phosphate and a potential curing agent and is of a thermosetting type.

The epoxy resin comprises at least one resin selected from the group consisting of a bisphenol epoxy resin (bisphenol resin), a rubber-modified bisphenol epoxy resin, a urethane-modified epoxy resin, a polyester type epoxy resin, and some combinations thereof, as described below.

The bisphenol epoxy resin, which may be used, is a resin in the form of a liquid having an epoxy equivalence of 170 to 230 and selected from the groups of a bisphenol A epoxy resin produced by reaction of bisphenol A and epichlorohydrin in the presence of an alkali, a bisphenol F epoxy resin produced by reaction of bisphenol F and epichlorohydrin, and diglycidyl ethers of bromide bisphenol A and alkylene oxide adducts of bisphenol A.

The rubber-modified bisphenol epoxy resin may be produced by a reaction between such bisphenol epoxy resin and butadiene-acrylonitrile copolymer rubber or a butadiene-acrylonitrile-(meth) acrylic acid terpolymer rubber. The rubber-modified bisphenol epoxy resin normally may be produced by blending the bisphenol epoxy resin with the rubber in a proportion of 5:1 to 1:4 by weight ratio and reacting the blend at a temperature of 80 to 180° C.

Alternatively, it is possible to produce rubber-modified bisphenol epoxy resin by reacting rubber powder derived from an emulsion of such rubber with such bisphenol epoxy resin. When the bisphenol epoxy resin and the rubber-modified bisphenol epoxy resin are used together, the rubber-modified bisphenol epoxy resin may be incorporated in an amount in a range of 100 to 500 parts by weight per 100 parts by weight of the bisphenol epoxy resin. If the amount of rubber-modified bisphenol epoxy resin blended is less than 100 parts by weight or more than 500 parts by weight, the balance of the flexibility with the toughness is degraded in the cured adhesive.

The urethane-modified epoxy resin may be prepared by reacting an excessive amount of diisocyanate with a polyoxy-alkylene ether polyol to provide a urethane prepolymer containing a free isocyanate group at a terminal end and reacting a compound having a hydroxyl group and a glycidyl group in one molecule with such urethane prepolymer. The polyoxy-alkylene ether polyol used includes those having a molecular weight in a range of 500 to 50,000, preferably 1,000 to 30,000. The diisocyanate used includes tolylene diisocyanate, diphenylmethane diisocyanate, naphthalene diisocyanate, isophorone diisocyanate, hexamethylene diisocyanate and the like, and particularly, tolylene diisocyanate and diphenylmethane diisocyanate are preferred. The reaction of polytetramethylene ether glycol and a diisocyanate may be carried out under conditions of an NCO/OH equivalence ratio of 1.05 to 1.3, a reaction time of 1 to 6 hours and a temperature of 60 to 120° C. in a nitrogen atmosphere. The compounds containing a hydroxyl group and a glycidyl group, which may be used, include glycidol, monoglycidyl ether, propyleneglycol monoglycidyl ether, butanediol monoglycidyl ether, hexanediol monoglycidyl ether, an epoxy resin, and the like. The proportion of incorporation of this compound is set so that the hydroxyl number is of 1.5 to 5.0 based on the isocyanate groups in the urethane prepolymer, and the reaction thereof is continued at a temperature of 80 to 120° C. until all of the isocyanate groups in the urethane prepolymer are reacted.

One effect of the urethane-modified epoxy resin is that of providing a satisfactory flexibility to the cured adhesive. Another effect is that of preventing, while electro-depositing the vehicle body panel 1, contamination of the electro-deposition coating due to an extraction of the adhesive and improving the conformability between an electro-deposition coating film and the adhesive.

When the bisphenol epoxy resin and the urethane-modified epoxy resin are used together, the urethane-modified epoxy resin may be incorporated in an amount in a range of 50 to 500 parts by weight per 100 parts by weight of the bisphenol epoxy resin. If the amount of incorporation of the urethane-modified epoxy resin is less than 50 parts by weight, the flexibility tends to be lost in the cured adhesive. On the other hand, if the amount of incorporation of the urethane-modified epoxy resin is more than 500 parts by weight, the thermal resistance is reduced, resulting in a degraded durability and hence, any amount exceeding 500 parts by weight is not desirable. The more desirable amount of incorporation of the urethane-modified epoxy resin is in a range of 15 to 50 parts by weight with respect to the total amount of the adhesive.

The polyester type epoxy resin is a diglycidyl ester type epoxy resin produced by reacting a carboxylic acid and epichlorohydrin. Diglycidyl esters which may be used include diglycidyl phthalate, diglycidyl tetrahydrophthalate, diglycidyl hexahydrophthalate, dimethyl diglycidyl phthalate, dimethylglycidyl hexahydrophthalate, dimer acid diglycidyl ester, a modified compound of dimer acid diglycidyl ester and the like. Particularly, the dimer acid diglycidyl ester type epoxy resin has a good compatibility to the ester compounds in the lubricant layer 5.

The polyester type epoxy resin may be incorporated in a proportion of 10 to 100 parts by weight per 100 parts by weight of the bisphenol epoxy resin. If the amount of incorporation of the polyester type epoxy resin is less than 10 parts by weight, the adhesive property to the lubricant layer 5 is liable to be degraded. If the amount of incorporation of the polyester type epoxy resin is more than 100 parts by weight, the cured adhesive is brittle. The more desirable amount of incorporation of the polyester type epoxy resin is in a range of 30 to 70 parts by weight.

The dehydrated phosphate used in the adhesive may be produced by heating a phosphate at a temperature of 100° C. or more for drying and dehydration. Desirable examples of phosphates are aluminum or zinc salts such as dihydrogen aluminum tripolyphosphate ($AlH_2P_3O_{10}.2H_2O$), zinc phosphate ($Zn_3(PO_4)_2.nH_2O$ wherein n=2 to 3). The heating dehydration may be conducted until water becomes at most 2.0% by weight at a temperature of 150 to 200° C. The amount of dehydrated phosphate incorporated in the adhesive is set in a range of 5 to 30% by weight. Any amount of dehydrated phosphate less than 5% by weight will result in insufficient corrosion prevention. Any amount of dehydrated phosphate exceeding 30% by weight will result in a brittle cured adhesive and hence, is not desirable for an adhesive utilized for hemming of a vehicle body.

Typical of the latent curing agents that may be used in the adhesive are dicyandiamide, 4,4'-diaminodiphenyl sulfone, imidazole derivatives (such as 2-methylimidazole and 2-n-heptadecylimidazole), isophthalic dihydrazide, adipic dihydrazide, N,N-dialkyl urea derivatives, melamine derivatives and the like. One or more of such compounds may be used. The latent curing agent is activated at a temperature of 80 to 200° C. and incorporated in an amount of 0.5 to 30 parts by weight.

If necessary, a filler may be used. Examples of fillers which are generally used are calcium carbonate, clays, talc, silica, metal powders, carbon, ferrite and the like. The amount of filler incorporated in the adhesive is set in a range of 5 to 70% by weight. If the amount of filler incorporated is less than 5% by weight, the adhesive has a reduced viscosity which causes a disadvantage that the adhesive flows during application. On the other hand, if the amount of filler incorporated is more than 70% by weight, the cured adhesive is brittle. If necessary, a dye, a pigment or the like may also be incorporated.

A test example for the bonded structure will now be described.

First, description will be made of the production of a rubber-modified bisphenol epoxy resin used for an epoxy resin type adhesive.

Using a ball mill, 392 parts by weight of water and 168 parts by weight of hydrated silica acid having an average particle size of 0.016 μm were mixed for 12 hours to provide an aqueous dispersion of the hydrated silica acid. A carboxylated NBR latex (available under a trade name of Lacstar 6541G from Dainippon Ink & Chemicals Inc.) having an average primary particle size of 0.2 μm and a solids content of 40% was blended in an amount of 240 parts by weight into this aqueous dispersion by stirring with a stirrer. The stirring was continued for 10 minutes.

Using a spray dryer, the mixture was dried under conditions of an inlet temperature of 200° C., an outlet temperature of 100° C. and a disk rotational speed of 24,000 rpm and then passed through a 80 mesh screen to provide a particulate matter having a particle size of 177 μm or less and comprised of hydrated silica acid fine powder particles adhered to surfaces of rubber particles. The average rubber content in this particulate matter was 36.4% by weight.

Next, 11 parts by weight of the particulate matter and 5 parts by weight of a filler (anhydrated silica) were blended to 100 parts by weight of an epoxy resin (available under a trade name of Epikote 828 from Shell Chemicals, Co., Ltd.). The blend was mixed homogeneously using three rolls to provide an epoxy resin composition which was then reacted at a temperature of 85 to 95° C. to give a rubber-modified bisphenol epoxy resin.

Dihydrogen aluminum tripolyphosphate was used as the phosphate and was heated for drying at 160° C. for 4 hours to prepare the dehydrated phosphate.

An epoxy resin based adhesive was prepared in the following proportion:

| | |
|---|---|
| Bisphenol epoxy resin (Epikote 807 available from Yuka Shell Epoxy, Co.) | 15 parts by weight |
| Rubber-modified bisphenol epoxy resin | 20 parts by weight |
| Urethane-modified epoxy resin (Adeka EPU-73 available from Asahi Denka Kogyo Co. Ltd.) | 15 parts by weight |
| Polyester based epoxy resin (IPU-22G available from okamura Seiyu Co., Ltd.) | 5 parts by weight |
| Latent curing agent (dicyandiamide) | 8 parts by weight |
| Dehydrated phosphate | 15 parts by weight |
| Fillers (iron oxide and $BaO-Fe_2O_3$ powders) | 20 parts by weight |

Two Al alloy sheets (the material used for the Al alloy pressed plate was JIS 6083) each having a lubricant layer 5 on a surface were bonded under heating and curing conditions of 180° C. and 30 minutes by use of an epoxy resin based adhesive of the type described above. This is a preferred example of the present invention.

For comparison, an epoxy resin based adhesive was prepared in the same manner, except that the polyester based epoxy resin was eliminated and the bisphenol epoxy resin was incorporated in an amount of 20 parts by weight, and using this epoxy resin based adhesive, the bonding was conducted in the same manner. This is a comparative example of the invention.

For determining the adhesive strength, the initial shear strength and the initial peel strength after heating and curing were measured in the example of the present invention and in the comparative example. For comparison of the corrosion preventing properties, an accelerated test for a so-called salt spray of an aqueous 5% NaCl solution at 35° C. was conducted for 30 days. Thereafter, the shear strength was measured in the example and in the comparative example and then, the measured value of the shear strength was compared with the initial shear strength to examine a reduction in strength.

The following Table shows the test results:

| (Kgf/cm) | Shear Strength | | Retention of strength (%) | Peel - Strength Initial |
|---|---|---|---|---|
| | Initial (kgf/cm$^2$) | After Spray of salt solution (kgf/cm$^2$) | | |
| Example | 125 | 119 | 95 | 16 |
| Comparative Example | 112 | 90 | 80 | 10 |

As apparent from the above Table, in the example, of the invention both the shear strength and the peel strength are excellent, as compared with the comparative example and, in particular, a good corrosion preventing property is provided. This is because the polyester type epoxy resin in the example has a good compatibility with the lubricant layer 5, and the bisphenol epoxy resin exhibits a higher adhesive strength. Moreover, the dehydrated phosphate produces a chelate compound together with Al ions of the from Al alloy sheet to suppress a reduction in strength due to water in the naturally oxidized film, which forms on the surface of the Al alloy sheet. Therefore, even if no degreasing and chemical conversion treatments are conducted, both the Al alloy sheets can be bonded, and an increased durability of the bonded structure can be provided.

It will be understood that the vehicle body panel of this invention may be used for an automobile fender, roof, bonnet, door or the like, but the present invention is also applicable to other components such as a vehicle body frame, a radiator or the like.

According to the present invention, an Al alloy pressed plate having a lubricant layer and another member of any type can be bonded firmly to each other by using an epoxy resin adhesive, as descried above, without any degreasing and chemical conversion treatments, and thereby a bonded structure having excellent durability is provided.

What is claimed is:

1. A method of providing an Al alloy pressed plate that is bonded with another structural member, comprising the steps of:
    applying a lubricant suitable for a pressing operation to a surface of an Al alloy plate having a naturally occurring oxide film thereon;
    subjecting said Al alloy plate to a pressing operation;
    applying an adhesive to the surface of said Al alloy pressed plate without degreasing said lubricant, said adhesive being formed of a dehydrated aluminum or zinc phosphate salt in the amount of 5 to 30% by weight; a latent curing agent; a polyester type epoxy resin; and at least one resin selected from the group consisting of a bisphenol epoxy resin, a rubber-modified bisphenol epoxy resin and a urethane-modified epoxy resin; and
    thereafter bonding another structural member to the Al alloy pressed plate via said adhesive while suppressing a reduction in bonding strength between the pressed plate and the structural member by said adhesive which may otherwise occur due to water in the naturally occurring oxide film that exists on the surface of the Al alloy pressed plate.

2. The method of claim 1, wherein said lubricant contains an ester-based compound.

3. The method of claims 1 and 2 wherein the bonded structure is used for a structural component of an automobile.

4. The method of claim 3, wherein the structural component is a body panel of the automobile.

5. The method of claim 3, wherein the structural component is a body frame of the automobile.

6. The method of claim 3, wherein the structural component is a radiator of the automobile.

7. The method of claim 1, further comprising applying a coating to said bonded structure and then curing said adhesive by heating when baking said coating.

8. The method of claim 1, wherein the epoxy resin consists of a combination of the bisphenol epoxy resin, the rubber-modified bisphenol epoxy resin, the urethane-modified epoxy resin and the polyester type epoxy resin.

9. The method of claim 1, wherein said polyester type epoxy resin is added in a proportion of 10 to 100 parts by weight per 100 parts by weight of said bisphenol epoxy resin.

10. The method of claim 9, wherein said polyester type epoxy resin is added in a proportion of 30 to 70 parts by weight per 100 parts by weight of said bisphenol epoxy resin.

11. The method of claim 1, wherein said adhesive contains in combination said bisphenol epoxy resin and said rubber-modified bisphenol epoxy resin.

12. The method of claim 11, wherein said rubber-modified bisphenol epoxy resin is added in a proportion of 100 to 500 parts by weight per 100 parts by weight of said bisphenol epoxy resin.

13. The method of claim 1, wherein said adhesive contains in combination said bisphenol epoxy resin and said urethane-modified resin.

14. The method of claim 13, wherein said urethane-modified epoxy resin is added in a proportion of 50 to 500 parts by weight per 100 parts by weight of said bisphenol epoxy resin.

15. The method of claim 1, wherein said adhesive layer contains in combination said bisphenol epoxy resin, said rubber-modified bisphenol epoxy resin and said urethane-modified epoxy resin.

16. The method of claim 1, wherein said adhesive further contains a filler in an amount of 5 to 70% by weight.

* * * * *